July 31, 1934.  E. N. FALES  1,968,382
WIND TUNNEL
Filed April 5, 1930

Inventor
Elisha N. Fales

Patented July 31, 1934

1,968,382

UNITED STATES PATENT OFFICE 1,968,382

WIND TUNNEL

Elisha N. Fales, Haverford, Pa.

Application April 5, 1930, Serial No. 441,987

22 Claims. (Cl. 35—12)

My invention relates in general to wind tunnels and more particularly to small portable wind tunnels. One object of my invention is to provide a cheap, simple wind tunnel wherein the turbulent propeller blast, instead of being conducted through long cumbersome passageways, or through spacious expensive building with the object of giving up its turbulence, will be smoothed and straightened out near its source; with the result that first cost is greatly reduced. Another object is to produce a wind tunnel of small bulk, and portable form, while at the same time attaining many of the good airflow characteristics of the large expensive wind tunnels. Another object is to provide a smooth air flow with speed under control of the observer, and models responding to these changes of speed, the apparatus being simple of operation by unexpert persons, and suitable for museums, schools, advertising displays etc. Other objects of my invention will be found in the accompanying specifications and claims, and will be disclosed in the drawing, in which—

Figure 1:
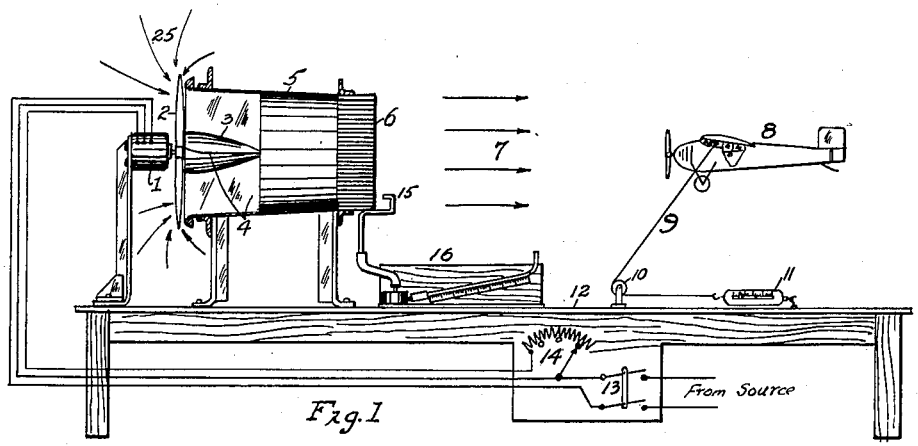
Fig. 1 is a line diagram and side elevation of the wind tunnel, powerplant, control, and object under test.

Referring to the drawing with greater particularity, 1 is a motor or power plant, 2 the fan producing an air blast, 3 is a core adapted to fill up the "dead-water" region near the fan-hub. At 4 radial vanes are shown for neutralizing the spiral motion of the propeller blast. 5 is a casing surrounding said core and radial vanes. 6 is a honeycomb to break up turbulent whirls in the air blast. 7 is the smooth air thus produced and flowing towards model 8. 9 is a tethering bridle, 10 is a pulley, 11 is an indicator of the aerodynamic forces produced. The tethering bridle 9 is a flexible member running on pulley 10, which is adapted to be attached to an aircraft model. When the model is subjected to the lifting influence of the stream of air issuing from the wind tunnel, the member 9 will permit ascent of the model from the platform, but will restrain it from being blown downstream. Pull on the tethering member will be registered on the spring balance 11, to which it is attached.

12 is a platform upon which the apparatus is assembled, 13 is a switch for actuating the electric power, 14 is a rheostat for regulating the fan speed. 15 is a pitot tube, connected by suitable rubber-hose to micromanometer 16, for showing the wind velocity.

Figure 2:
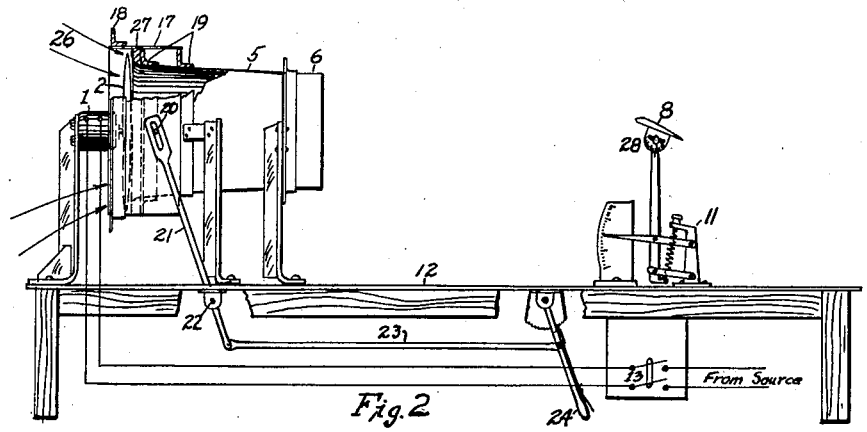
Fig. 2 is a line diagram and side elevation of another form of the wind tunnel.

In Fig. 2 17 is a cylindrical casing, stiffened by angle iron ring 18. 19 shows two structure rings fastened to the casing 5, and providing at their outer diameters bearing surfaces on which may slide the cylinder 17. 20 is a pin fastened to the sleeve 17, 21 is a slotted lever engaging the pin 20, 22 is a pivot about which swings the lever 21. 23 is a link for actuating lever 21. 24 is a speed control handle. At 25 in Figure 1 are arrows showing airflow into fan when cylinder 17 does not surround fan tips. At 26 in Figure 2 are arrows showing airflow when cylinder is moved to the left thus surrounding fan.

The operation of the device is as follows:—

The motor 1 and fan 2 produce an air blast 7, whose velocity is indicated by a micromanometer 16 or by other suitable device. The velocity can be controlled through rheostat 14 or lever 24 and switch 13. The blast is driven into the casing 5 which has a diameter smaller than the fan 2. The vanes 4 kill the race rotation of the blast, thus facilitating good flow at the axial center of the casing 5. Were it not for the core 3 and vanes 4 the blast would crowd towards the circumference of the casing, leaving the central region with little flow, and resulting in uneven distribution of velocity.

After leaving the vanes and core the air passes through the cellular honeycomb 6 which decreases further the spiral tendencies of flow and contributes to rectilinear motion of the air currents. As a result the blast indicated by arrows 7 is relatively steady, is free of serious turbulence, and has uniform distribution of velocity. In such a flow the model 8 flies with steady equilibrium, which would not be the case in a turbulent or pulsating flow. For example, the blast from an electric fan, if not straightened by the devices I have invented, would not be suitable for flying the model indicated at 8, but would cause the model to pitch and rock, and usually dive to the ground. Poised in the smooth flow, the model experiences air forces which are not erratic, and which may be measured on the scale 11 by the operator.

In Fig. 2 is shown a variation of my device in which the airspeed is regulated without altering the motor-propeller revolutions per minute. The purpose is to admit using a single-speed alternating current motor, which is cheaper and often more available than a variable-speed motor. The principle by which the airspeed is controlled is as follows:—

Most of the air entering the fan is as shown by arrows 25 in Fig. 1. A large amount of air enters the fan centripetally near the tips, and if this tip air is restrained from entry, the volume of air handled by the fan is materially reduced, since only the air indicated by arrows 26 in Fig. 2 may enter. As a result the volume and velocity of the blast 7 are decreased.

In Fig. 2 the sleeve 17 is drawn in position corresponding to minimum air volume and minimum speed of flow. To raise the speed, lever 24 must be moved to the left, which causes sleeve 17 to slide to the right, guided by the two angle-iron rings 19. As the sleeve is slid more and more to the right, the volume of air entering at the fan tips increases. The extreme position of cylinder is attained when the ring 18 is in the plane of the flared inlet 27 of the casing 5.

In Fig. 1 the model 8 is a light airplane model, shaped and balanced to attain flying properties, and flying like a kite under the influence of the smooth non-turbulent air blast. In Fig. 2 the model is not equally free, but is mounted on a supporting rod extending from a spring-balance 11. In Fig. 2 the model 8 is a wing, whose angle of attack may be altered by means of a thumbnut, and this angle read on the quadrant 28. Thus a demonstration can be made of the change in lift force which occurs when the wing angle changes.

While there are shown in Figs. 1 and 2 only two sorts of models, it is the purpose of my invention that any object may be used in conjunction with the fan and air-straightening devices. For example, wings may be poised to swing under the influence of the air stream, in demonstration of the laws of center of pressure. Or, the relative resistances of various objects may be shown by drag balance. Or, the effect of the tail may be demonstrated by first pivoting a tailless airplane in the blast, then adding the tail. Or, for scenic and advertising purposes, an artificial bird may be made to flap its wings by the agency of the blast, etc.

I claim:

1. In a device of the class described, a tubular casing having an inlet and an outlet end, a fan rotatably mounted at the inlet end of the casing and adapted to propel a fluid stream through the casing, a core concentrically mounted within the casing at its inlet end and being tapered toward the casing outlet, and longitudinal vanes extending radially from the core.

2. In a device of the class described, a tubular casing having an inlet and an outlet end, a fan rotatably mounted at the inlet end of the casing and adapted to propel a fluid stream through the casing, a core concentrically mounted within the casing at its inlet end and being tapered toward the casing outlet, and longitudinal vanes extending radially from the core to the casing wall.

3. In a device of the class described, a tubular casing having an inlet and an outlet end, a fan rotatably mounted at the inlet end of the casing and adapted to propel a fluid stream through the casing, a core concentrically mounted within the casing at its inlet end and being tapered toward the casing outlet, longitudinal vanes extending radially from the core, and a honeycomb located at the outlet end of the casing.

4. In a device of the class described, a tubular casing having an inlet and an outlet end, a fan rotatably mounted at the inlet end of the casing and adapted to propel a fluid stream through the casing, a core concentrically mounted within the casing at its inlet end and being tapered toward the casing outlet, and longitudinal vanes extending radially from the core, the casing being tapered from the inlet end toward the outlet.

5. In a device of the class described, a tubular casing having an inlet and an outlet end, a fan rotatably mounted at the inlet end of the casing and adapted to propel a fluid stream through the casing, a core concentrically mounted within the casing at its inlet end and being tapered toward the casing outlet, longitudinal vanes extending radially from the core, and a honeycomb located at the outlet in spaced relation to the core, the casing being tapered from the inlet to the honeycomb.

6. In a device of the class described, a casing having an inlet and an outlet end, a propeller fan mounted rotatably at the inlet end of the casing concentric thereto and having a tip diameter greater than the internal diameter of the inlet and means located inside the casing for neutralizing spiral and turbulent motion of the fluid stream.

7. In a device of the class described, a casing having an inlet and an outlet end, a propeller fan mounted rotatably at the inlet end of the casing concentric thereto and having a tip diameter greater than the internal diameter of the inlet, a core concentrically mounted within the casing at its inlet end and being tapered toward the outlet, and longitudinal vanes extending radially from the core.

8. In a device of the class described, a casing having an inlet and an outlet end, a propeller fan mounted rotatably at the inlet end of the casing concentric thereto and having a tip diameter greater than the internal diameter of the inlet, a core concentrically mounted within the casing at its inlet end and being tapered toward the outlet, longitudinal vanes extending radially from the core, and a honeycomb located at the outlet end of the casing.

9. In a device of the class described, a casing having an inlet and an outlet end, a propeller fan mounted rotatably at the inlet end of the casing concentric thereto and having a tip diameter greater than the internal diameter of the inlet, and means located inside the casing for neutralizing spiral and turbulent motion of the fluid stream, the casing being tapered from its inlet end toward the outlet.

10. In a device of the class described, a wind tunnel adapted to deliver a smooth fluid blast through its outlet end, a landing platform for aircraft model located outside the tunnel downstream from its outlet, and a flexible member projecting from the upper surface of the landing platform for attachment to an aircraft model and adapted to restrain it against axial movement downstreamwardly from the tunnel outlet.

11. In a device of the class described, a rotatable fan, a sleeve mounted adjacent to the fan concentric thereto for axial movement, and supporting means for the fan and sleeve.

12. In a device of the class described, a rotatable fan, a sleeve of greater internal diameter than the fan tip diameter mounted concentric to the fan for axial movement and adapted to be moved into a position surrounding the fan tips, and supporting means for the fan and sleeve.

13. In a device of the class described, a tubular casing, a fan rotatably mounted at one end of the casing concentric thereto, and a sleeve of greater diameter than the fan mounted concentric to the casing for axial adjustment and adapted to be moved into a position surrounding the fan tips.

14. In a device of the class described, a tubular casing having an inlet and an outlet end, a fan rotatably mounted at the inlet end of the casing, and a sleeve mounted concentric to the casing for axial adjustment.

15. In a device of the class described, a tubular casing having an inlet and an outlet end, a fan rotatably mounted at the inlet end of the casing, and a sleeve of greater diameter than the fan mounted on the casing concentric thereto for axial adjustment and adapted to be moved into a position surrounding the fan.

16. In a device of the class described, a tubular casing having an inlet and an outlet end, a fan rotatably mounted at the inlet end of the casing and having a tip diameter greater than the diameter of the casing inlet opening, and a sleeve mounted concentric to the casing for axial adjustment and being of greater diameter than the fan, the sleeve being adapted to be moved into a position surrounding the fan tips.

17. In a device of the class described, a tubular casing having an inlet and an outlet end, a fan rotatably mounted at the inlet end of the casing and having a tip diameter greater than the diameter of the casing inlet opening, a sleeve mounted concentric to the casing for axial adjustment and being of greater diameter than the fan, the sleeve being adapted to be moved into a position surrounding the fan tips, and a lip projecting outwardly from the casing inlet past the fan tips and being adapted to fit the inner surface of the sleeve for sliding contact.

18. In a device of the class described a wind tunnel having an outlet opening and adapted to deliver a fluid stream through the opening, a landing platform for an aircraft model outside the tunnel downstream from the outlet opening, and means adapted to be attached to an aircraft model mounted on the landing platform adapted to restrain the model against downstreamward movement while permitting ascension from the platform.

19. In a device of the class described a wind tunnel having an outlet opening and adapted to deliver a fluid stream through the opening, a landing platform for an aircraft model outside the tunnel downstream from the outlet opening, means adapted to be attached to an aircraft model mounted on the landing platform adapted to restrain the model against downstreamward movement while permitting ascension from the platform, and means for regulating the velocity of the fluid stream.

20. In a device of the class described a wind tunnel having an outlet opening and adapted to deliver a fluid stream through the opening, a landing platform for an aircraft model outside the tunnel downstream from the outlet opening, means adapted to be attached to an aircraft model mounted on the landing platform adapted to restrain the model against downstreamward movement while permitting ascension from the platform, and means for measuring the forces applied to the restraining means.

21. In a device of the class described a wind tunnel having an outlet opening and adapted to deliver a fluid stream through the opening, a landing platform for an aircraft model outside the tunnel downstream from the outlet opening, means adapted to be attached to an aircraft model mounted on the landing platform adapted to restrain the model against downstreamward movement while permitting ascension from the platform, means for regulating the velocity of the fluid stream, and means for measuring the forces applied to the restraining means.

22. An aeronautical device including a model of an aerial vehicle, a vertically movable support for said model, and regulable means for producing a stream of air into which the model is arranged to head and for causing said model and its support to move vertically.

ELISHA N. FALES.